United States Patent
Buford et al.

(10) Patent No.: US 10,999,499 B2
(45) Date of Patent: May 4, 2021

(54) BACKGROUND REPLACEMENT FROM VIDEO IMAGES CAPTURED BY A PLENOPTIC CAMERA

(71) Applicant: Avaya Inc., Basking Ridge, NJ (US)

(72) Inventors: John F. Buford, Princeton, NJ (US); Mehmet C. Balasaygun, Freehold, NJ (US)

(73) Assignee: Avaya, Inc., Durham, NC (US)

( * ) Notice: Subject to any disclaimer, the term of this patent is extended or adjusted under 35 U.S.C. 154(b) by 936 days.

(21) Appl. No.: 14/921,652

(22) Filed: Oct. 23, 2015

(65) Prior Publication Data

US 2016/0284096 A1 Sep. 29, 2016

Related U.S. Application Data (60) Provisional application No. 62/137,921, filed on Mar. 25, 2015.

(51) Int. Cl.
| | |
|---|---|
| *H04N 5/225* | (2006.01) |
| *H04N 5/232* | (2006.01) |
| *G06T 7/11* | (2017.01) |
| *G06T 7/194* | (2017.01) |
| *H04N 5/272* | (2006.01) |

(52) U.S. Cl.
CPC .......... *H04N 5/23232* (2013.01); *G06T 7/11* (2017.01); *G06T 7/194* (2017.01); *H04N 5/272* (2013.01); *G06T 2207/10052* (2013.01)

(58) Field of Classification Search
CPC ..... H04N 5/23232; H04N 5/272; G06T 7/194
USPC ....................................................... 348/218.1
See application file for complete search history.

(56) References Cited

U.S. PATENT DOCUMENTS

| | | | | |
|---|---|---|---|---|
| 2007/0133880 A1* | 6/2007 | Sun | ........................ | G06K 9/38 382/195 |
| 2013/0156264 A1* | 6/2013 | Martensson | .......... | G06T 7/0075 382/103 |
| 2014/0176663 A1* | 6/2014 | Cutler | .................... | H04N 7/142 348/14.07 |
| 2015/0010236 A1* | 1/2015 | Chang | .................... | G06T 5/003 382/195 |

* cited by examiner

*Primary Examiner* — Usman A Khan (57) ABSTRACT

Embodiments disclosed herein provide systems, methods, and computer readable media for replacing a video background in real-time. The video comprises a plurality of image frames. In a particular embodiment, a method provides generating a range image from a subject image frame of the plurality of image frames. The range image indicates pixel distances from a plenoptic camera that captured the plurality of image frames. The method further provides identifying background pixels that represent a background portion of the subject image frame based on the range image and replacing the background pixels with replacement background pixels in the subject image frame.

20 Claims, 6 Drawing Sheets

Figure 8

BACKGROUND REPLACEMENT FROM VIDEO IMAGES CAPTURED BY A PLENOPTIC CAMERA

RELATED APPLICATIONS

This application is related to and claims priority to U.S. Provisional Patent Application No. 62/137,921, entitled "REAL-TIME BACKGROUND REPLACEMENT IN AGENT VIDEO CALLS FOR CUSTOMER CARE," filed on Mar. 25, 2015, and which is hereby incorporated by reference in its entirety.

TECHNICAL FIELD

Aspects of the disclosure are related to video image manipulation and, in particular, to replacing background portions of a video image.

TECHNICAL BACKGROUND

Communication and computing systems allow users to exchange video communication from almost anywhere that a wired or wireless network connection is available. User devices including personal workstations, laptops, smartphones, tablets, and the like, all have the ability to exchange video communications. For example, users can make personal video calls from their cellphones or an enterprise's contact center can distribute agents throughout the world. In the latter example, contact center agents may even be able to work from home rather than a contact center facility and still participate in video communications with callers.

Unlike audio or text communications, video communications capture both the user and, in the background, portions of the location in which the user is located. In some cases, that location may not be appropriate for the video communication or otherwise is less preferred than another background. For example, a user may need to make a business related video call while on a beach vacation. It would likely not be appropriate for the beach to be in the background while the user is participating in that video call. In an alternative example, a contact center that allows its agents to work from home may still want a consistent background behind all agents regardless of their location. However, current techniques for background replacement require a relatively large amount of processing resources to identify backgrounds, sometimes requiring solid color backgrounds (e.g. blue/green screen used in chroma keying), or require hardware in addition to the camera capturing video, such as an infrared blaster and sensor.

OVERVIEW

Embodiments disclosed herein provide systems, methods, and computer readable media for replacing a video background in real-time. The video comprises a plurality of image frames. In a particular embodiment, a method provides generating a range image from a subject image frame of the plurality of image frames. The range image indicates pixel distances from a plenoptic camera that captured the plurality of image frames. The method further provides identifying background pixels that represent a background portion of the subject image frame based on the range image and replacing the background pixels with replacement background pixels in the subject image frame.

In some embodiments, generating the range image comprises calculating a pixel distance for each pixel in at least a subset of pixels in the subject image frame based on perspectives of each pixel as captured by the plenoptic camera.

In some embodiments, the replacement background pixels represent an image frame of a second video.

In some embodiments, identifying the background pixels comprises identifying pixels of the subject image frame having pixel distances greater than a threshold distance from the plenoptic camera.

In some embodiments, the threshold distance comprises a pixel distance greater than that of pixels in the subject image frame representing a user in the subject image frame.

In some embodiments, the method further provides establishing a video communication between a first communication system having the plenoptic camera and a second communication system.

In some embodiments, after replacing the background pixels, the method provides transferring the subject image frame to the second communication system.

In some embodiments, the first communication system comprises one of a plurality of communication systems for a contact center.

In some embodiments, the generating the range image, identifying the background pixels, and replacing the background pixels are each performed by the first communication device.

In some embodiments, the method further provides generating a second range image from a second subject image frame of the plurality of image frames. The second range image indicates second pixel distances from the plenoptic camera. The method also provides identifying second background pixels that represent a second background portion of the second subject image frame based on the second range image and replacing the second background pixels with second replacement background pixels in the subject image frame.

In another embodiment, a video processing system is provided including an interface and a processing system. The interface is configured to receive the video from a plenoptic camera that captured the plurality of image frames. The processing system is configured to generate a range image from a subject image frame of the plurality of image frames, identify background pixels that represent a background portion of the subject image frame based on the range image, and replace the background pixels with replacement background pixels in the subject image frame.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Plenoptic cameras (also called light field cameras) are able to capture light intensity of a scene and information about direction the captured light was travelling. One way of implementing a plenoptic camera is to place an array of micro lenses between a camera's image sensor and its primary lens. There may be as few as two micro lenses up to any number depending on the size of the lens and the size of the image sensor. This micro lens arrangement allows each of the micro lenses refocus the light coming through the primary lens onto a portion of the image sensor under each respective micro lens. Accordingly, due to their close proximity, adjacent micro lenses focus similar images onto their corresponding sensor portions. However, since each micro lens is in a slightly different position from one another, the light for an image that reaches one micro lens' portion of the image sensor is travelling in a different direction than the light that reaches another micro lens' portion of the image sensor. The perspective of the image focused onto one portion of the sensor is therefore slightly different than the image on another adjacent portion of the sensor. The difference in perspective is greater for micro lenses located further apart. It is from this difference in perspective that a relative distance can be calculated for each pixel in an image.

Figure 1:
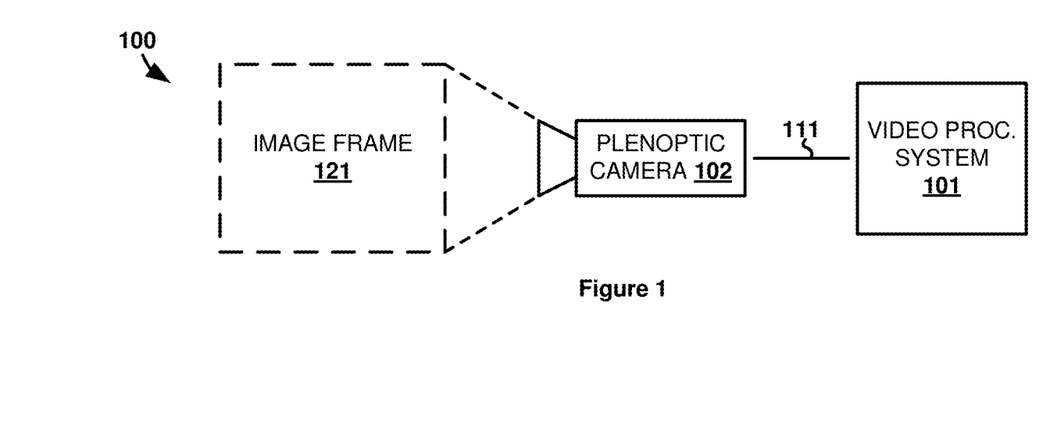
FIG. 1 illustrates a video capture environment for replacing a video image background.

FIG. 1 illustrates video capture environment 100 in an example scenario for replacing a video image background. Video capture environment 100 includes video processing system 101 and plenoptic camera 102. Video processing system 101 and plenoptic camera 102 communicate over communication link 111.

While shown separately, plenoptic camera 102 and video processing system 101 may be combined into a single device, such as a smartphone, tablet, personal computer, video display monitor, or other type of computing device. Plenoptic camera 102 captures video image frames that together in sequence form a video image. Since each image frame captured by plenoptic camera 102 includes multiple images captured by different portions of an image sensor within plenoptic camera 102, video processing system 101 selects between the multiple images, and in some cases combines at least a portion of the multiple images, in order to create an image. It is these post processed images that are combined to create a video that may be played back to a user, transferred to another system, stored in a storage system, or used for some other purpose.

Figure 2:
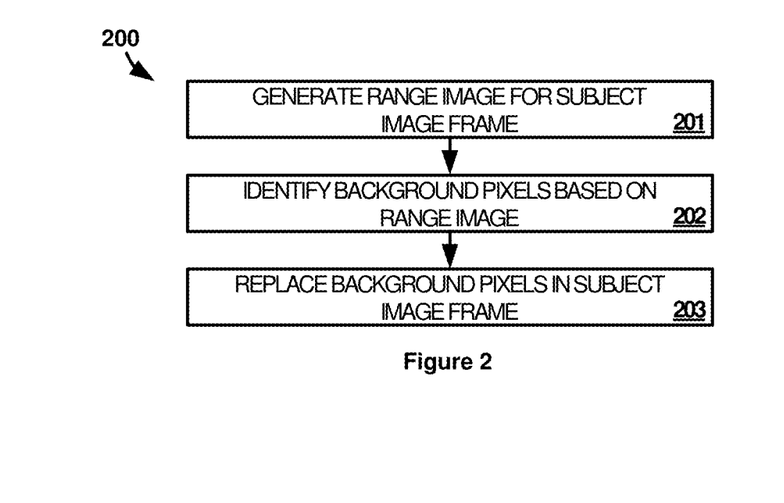
FIG. 2 illustrates a method of operating the video capture environment to replace a video image background.

FIG. 2 illustrates a method 200 for operating video capture environment 100 to replace a video image background. Method 200 provides video processing system 101 generating a range image from subject image frame 121 of image frames captured by plenoptic camera 102 (step 201). The range image indicates pixel distances from plenoptic camera 102. Specifically, the range image indicates pixel distances relative to plenoptic camera 102's position. The pixel distances may correspond to each individual pixel or to a group of pixels. In some cases, only pixel distances for pixels that have changed since a prior image frame was captured may be determined to avoid using processing resources to determine already known pixel distances. It should be understood that each of the pixel distances correspond to pixels of subject image frame 121 after processing the multiple images captured by plenoptic camera 102's sensor into a single image that can be displayed to a user, as described above. However, as also described above, it is the multiple perspectives offered by the multiple images that are used to determine the relative distances from plenoptic camera 102 of each pixel in the post-processed subject image frame 121. The pixel distances themselves may be derived using any known method of determining pixel distances captured by a plenoptic camera.

Method 200 then provides video processing system 101 identifying background pixels that represent a background portion of the subject image frame based on the range image (step 202). A pixel distance threshold may be used to determine whether a pixel distance corresponds to a background pixel. The threshold distance may be a constant distance or may be adaptable depending on the scene captured in subject image frame 121. For example, image processing may be performed on subject image frame 121 or on a previously captured image frame in order to identify a user in the frame. The pixels representing the user in subject image frame 121 may then be identified as the pixels having roughly the same pixel distance and location in subject image frame 121. The threshold distance may then be set to a value that indicates all pixels further from plenoptic camera 102 than those representing the user in subject image frame 121 correspond to background pixels. Preferably the threshold distance is set great enough so as to account for normal variations in a pixel distance for the user that is cause by the user's movement during the capture of the video.

In some examples, certain items that may otherwise be considered in the background of subject image frame 121 (e.g. a plant, window, etc.) may be identified in a similar manner as described for the user above and may be differentiated from the rest of the background based on one or more additional threshold distances. Likewise, items having pixels with distances on either side of the pixel distance threshold may not be considered part of the background. For example, an ell shaped desk where one portion is in front of a user and another portion that extends to the side of the user may extend beyond the threshold pixel distance. However, the desk as a whole may be excluded from the background pixels.

Once the background pixels are identified, method 200 provides video processing system 101 replacing the background pixels with replacement background pixels in subject image frame 321 (step 203). The replacement background pixels may comprise pixels of any color or may be multiple colors. As a whole the pixels may represent a still image or may represent pixels in a frame of a background video, whereby the replacement pixels in subsequent subject image frames may change in accordance with the background video. In some cases, the image represented by the replacement background pixels may be resized or otherwise changed in order to best fit in the space of subject image frame 121 that was occupied by the background pixels. Similarly, portions of the image represented by the replacement background pixels may not be included in the replacement pixels if the background pixels being replaced do not allow for the entire background image (i.e. the non-background pixels of the image remain where those non-included portions would be placed). For example, a user in the foreground of subject image frame 121 may displace a corresponding portion of the background image just as the user would be obscuring whatever was behind the user in the original background. Moreover, in some cases, the replacement background pixels may be implemented in such a way as to maintain the look in subject image frame 121 of the background being behind the image portions that remain in the foreground. For example, a background image may be presented by the replacement pixels such that a viewer of subject image frame 121 would see it as being a distance (e.g. a number of feet) behind any object in the foreground.

It should be understood that while method 200 regarding subject image frame 121 works to replace the background of a still image, method 200 is repeated on the other image frames captured by plenoptic camera 102 in order to remove the background from the video. Advantageously, replacing the background using method 200 should be less resource intensive than other background detection and replacement methods, which makes method 200 suitable for real-time background replacement during live video transmissions or real-time video communications. For example, method 200 does not use the image processing techniques required to detect an image background based on the visuals of the image itself. Likewise, method 200 is not affected by cluttered background colors in a captured image or motion in the background between frames, which therefore removes the advantage of solid colored backgrounds (e.g. blue/green screens for chroma keying). Moreover, additional sensors used to gather a depth of a scene, such as infrared sensors, are not needed.

Referring back to FIG. 1, video processing system 101 comprises a computer processor system and an interface for communicating with plenoptic camera 102. Video processing system 101 may also include other components such as a router, server, data storage system, user interface, and power supply. Video processing system 101 may reside in a single device or may be distributed across multiple devices. Video processing system 101 may be a video communication server, conferencing system, application server, personal computer workstation, smartphone, tablet, or some other computing system—including combinations thereof.

Plenoptic camera 102 comprises a lens, a digital image sensor, and an interface for communicating with video processing system 101. Plenoptic camera 102 may further include a power supply, user interface, or some other component for operating a plenoptic camera. While shown separately, plenoptic camera 102 may be incorporated into video processing system 101. Plenoptic camera 102 may be a standard plenoptic camera or a focused plenoptic camera, which both use additional micro lenses in addition to the lens above, may be a coded aperture camera, or may be some other type of light field camera.

Communication link 111 use metal, glass, air, space, or some other material as the transport media. Communication link 111 could be an internal link, such as a system bus, if plenoptic camera 102 and video processing system 101 are part of a single device. Communication link 111 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication link 111 could be direct links or may include intermediate networks, systems, or devices.

Figure 3:
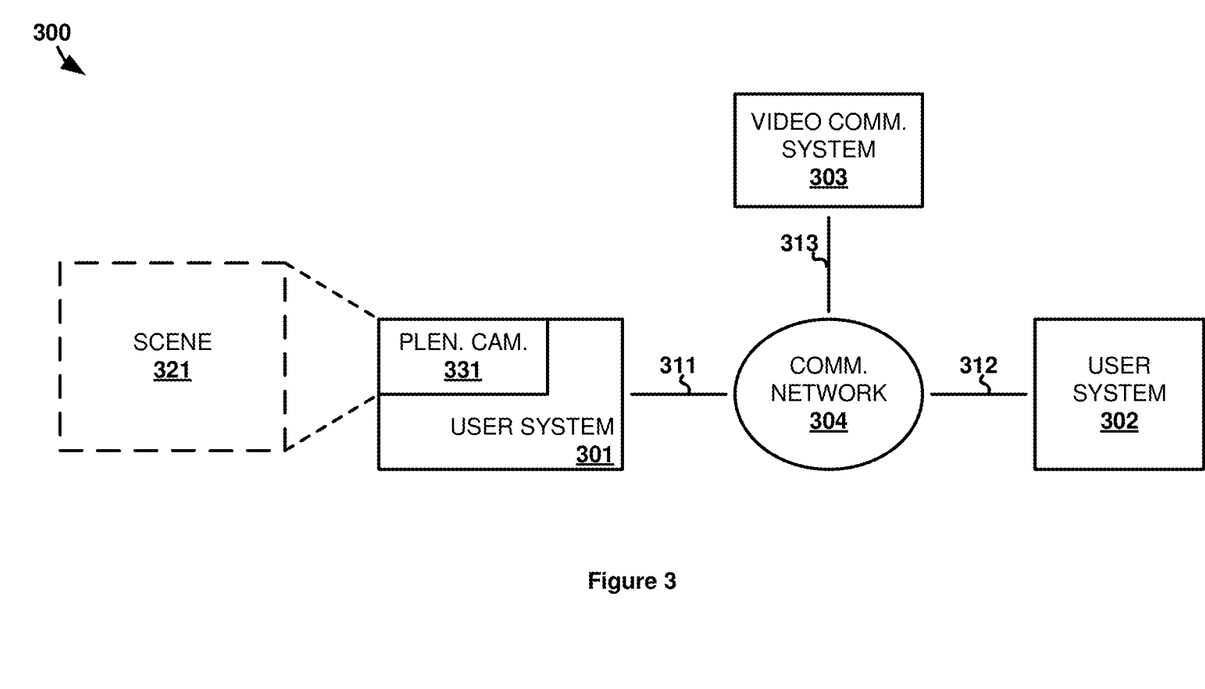
FIG. 3 illustrates a video communication environment for replacing a video image background.

FIG. 3 illustrates video communication environment 300 in an example scenario for replacing a video image background. Video communication environment 300 includes user system 301, user system 302, video communication system 303, and communication network 304. User system 302 includes plenoptic camera 331. User system 301 and communication network 304 communicate over communication link 311. User system 302 and communication network 304 communicate over communication link 312. Video communication system 303 and communication network 304 communicate over communication link 313.

Communication network 304 comprises network elements that provide communications services. Communication network 304 may comprise switches, wireless access nodes, Internet routers, network gateways, application servers, computer systems, communication links, or some other type of communication equipment—including combinations thereof. Communication network 304 may be a single network (e.g. local area network, wide area network, the Internet, etc.) or may be a collection of networks.

Video communication system 303 is a system that facilitates the exchange of real-time video communications between user systems 301 and 302. The video communications may be unidirectional from user system 301 to user system 302 or may be bidirectional should user system 302 be equipped with a camera or other component necessary for video communications. Video communication system 303 may be a video conferencing system that manages video conferences between multiple parties. Thus, while video communication environment 300 only includes user systems 301 and 302, video communication system 303 may be able to manage conferences between more than two user systems. Similarly, video communication system 303 may be used to handle video calls with a contact center for an entity allowing users (e.g. customers of the entity) to communicate with agents using video. Also, it should be understood that some embodiments may remove the need for video communication system 303 altogether, as may be the case in a peer-to-peer video communication between user systems 301 and 302.

Figure 4:
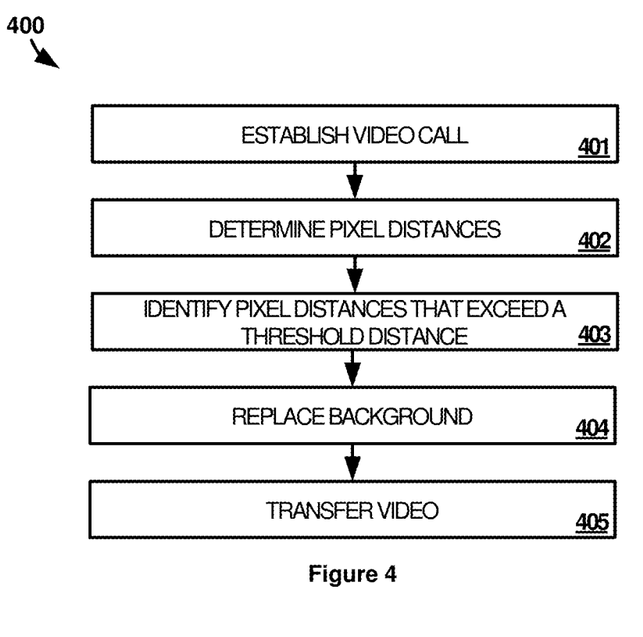
FIG. 4 illustrates a method of operating the video communication environment to replace a video image background.

FIG. 4 illustrates a method 400 for operating video communication environment 300 to replace a video image background. Method 400 provides that a video call is established between user system 301 and user system 302 (step 401). The video call may be a one-on-one video call between user systems 301 and 302, may be a conference call for which user systems 301 and 302 are a part, or may be some other type of video communication. The video call may be initiated from either of user systems 301 and 302, by video communication system 303, or may be initiated from some other system. The video call may only transfer video from user system 301 to user system 302, although, user system 302 may transfer video to user system 301 if properly equipped. In a one-way video situation, audio and video may be transferred from user system 301 to user system 302 while only audio is transferred from user system 302 to user system 301.

During the video call, video is captured of scene 321, which may include a user of user system 301, and pixel distances are determined for the image frames that make up the video (step 402). As in method 200 described above, the pixel distances of each image frame can be determined from the difference(s) in perspective captured by different portions of plenoptic camera 331's image sensor. Pixel distances that exceed a threshold distance are then identified to identify corresponding pixels as being in the background of the video (step 403). The background pixels of each image frame are then replaced with replacement background pixels in order to replace the background of the video (step 404).

After replacing the background, the image frames are transferred to user system 302 as video (step 405). It should be understood that each frame of the video is captured and processed to replace the background in substantially real-time so as not to adversely effect the user experience of the video call. Accordingly, the video is received by user system 302 without noticeable delay caused by the background image replacement.

Figure 5:
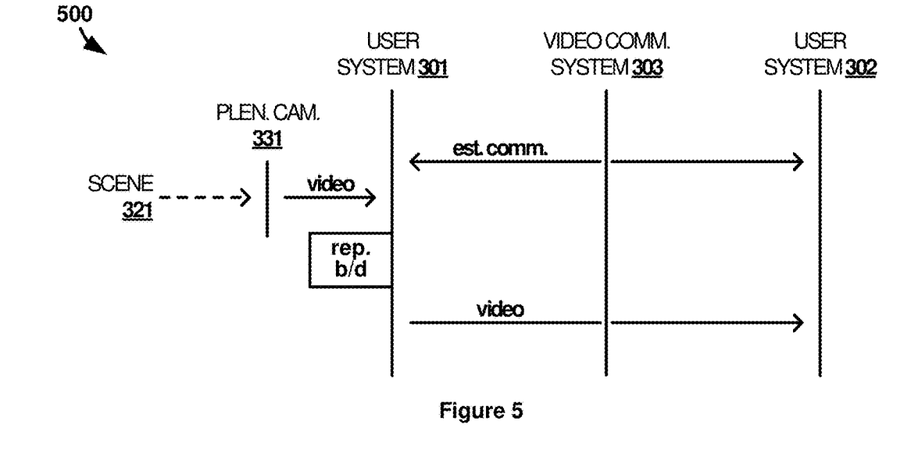
FIG. 5 illustrates an operational scenario of the video communication environment to replace a video image background.

FIG. 5 illustrates an operational scenario 500 of video communication environment 300 to replace a video image background. In scenario 500, a video communication session is established between user systems 301 and 302. While video communication system 303 may facilitate the establishment of the video communication, media for the video communication session (e.g. audio, video, etc.) does not necessarily pass through video communication system 303. Scene 321 for the video communication is captured by plenoptic camera 331, which passes the video of scene 321 to user system 301 for processing. During processing, user system 301 generates a video image suitable for being presented to a user. That is, user system 301 creates a video image from the multiple images captured by plenoptic camera 331. Additionally, user system 301 identifies and replaces the background of that video image using pixel distance information from the multiple images captured by plenoptic camera 331, as described above. The video is then transferred to user system 302 for display to a user of user system 302.

Figure 6:
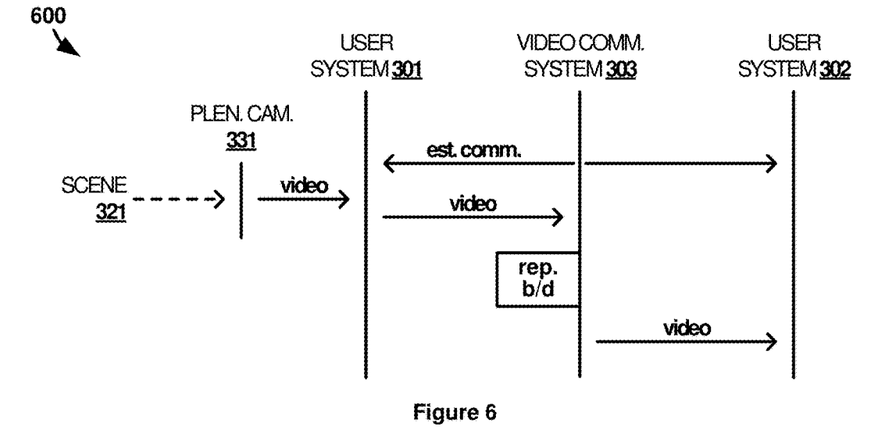
FIG. 6 illustrates an operational scenario of the video communication environment to replace a video image background.

FIG. 6 illustrates an operational scenario 600 of video communication environment 300 to replace a video image background. As in scenario 500, in scenario 600 video communication system 303 establishes a video communication between user systems 301 and 302. However, in scenario 600 at least the video from user system 301 is transferred through video communication system 303 from user system 301 before reaching user system 302. Accordingly, after scene 321 is captured by plenoptic camera 331 and passed to user system 301, the video is transferred by user system 301 to video communication system 303. The video as transferred to video communication system 303 includes the multiple images captured by plenoptic camera 331 and has yet to be processed into a video image for display. As such, video communication system 303 is able to and does perform the background identification and replacement for the video instead of user system 301 as was the case in scenario 500. In alternative examples, user system 301 may generate a range image and transfer the range image along with a displayable video image to video communication system 303 rather than transferring the multiple images as captured by plenoptic camera 331.

The video having the replaced background is then transferred from video communication system 303 to user system 302 where the video can be presented to a user. In some examples, video communication system 303 may also transfer the video to user system 301 for presentation to a user of user system 301. This allows the user of user system 301 to view the video after the background has been replaced even though user system 301 did not itself process the video, as would be the case in scenario 500.

Figure 7:
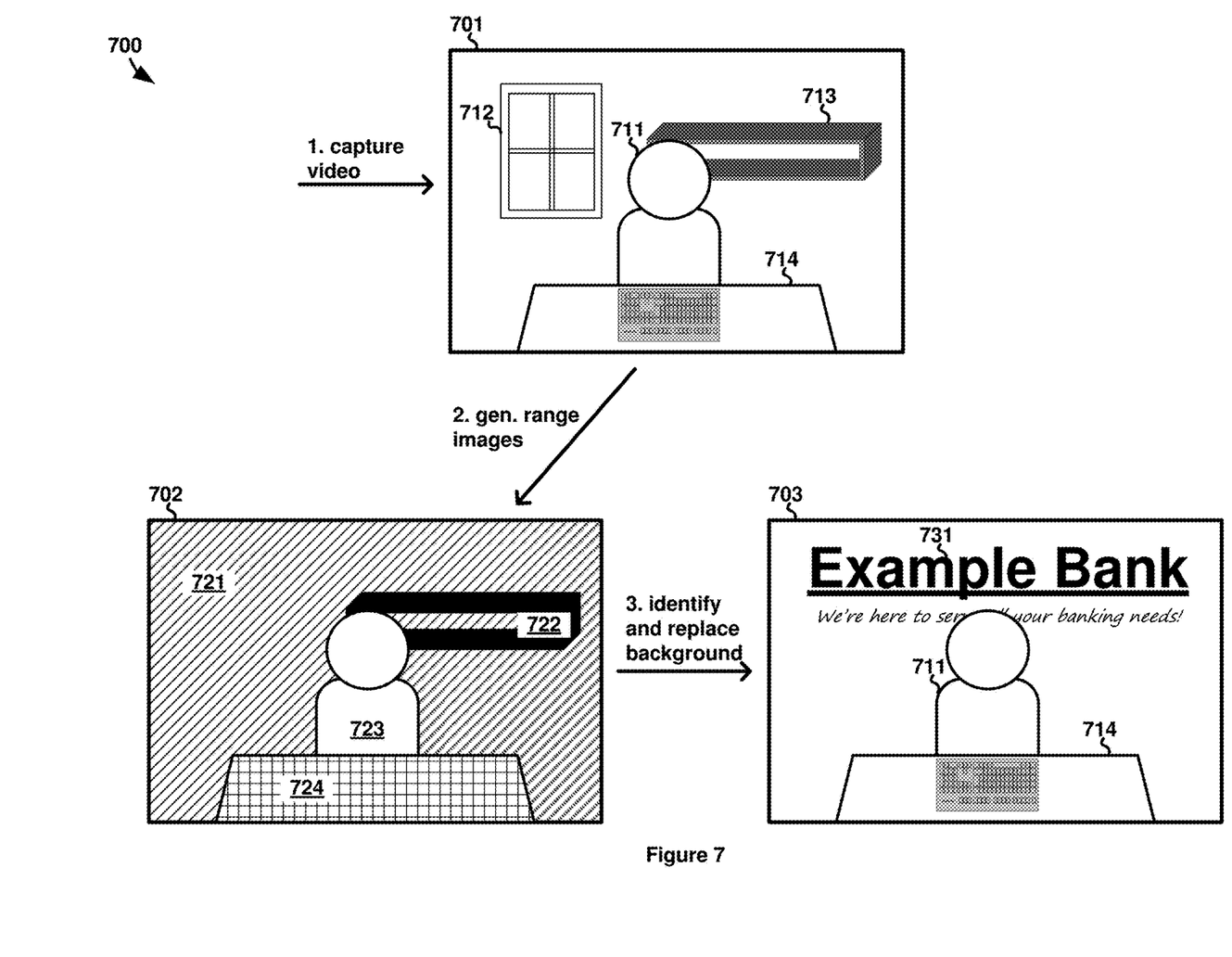
FIG. 7 illustrates video images from an operational scenario of the video communication environment to replace a video image background.

FIG. 7 illustrates video images from an operational scenario 700 of video communication environment 300 to replace a video image background. At step 1, video is captured of scene 321 via plenoptic camera 331. Subject image frame 701 is an image frame of the captured video. In particular, subject image frame 701 comprises a frame of the video after processing the multiple images captured by plenoptic camera 331 into a single image that can be presented to a user. Subject image frame 701 shows user 711 sitting at desk 714 with a shelf 713 and a window 712 located on a wall behind user 711. It should be understood that while scenario 700 illustrates subject image frame 701, subject image frame 701 may never be displayed to a user but, rather, may merely exist as data in video communication environment 300.

In this example, user 711 is an agent working for a bank called Example Bank. The captured video is part of a video call with a customer of Example Bank. User 711 is one of many agents employed for customer service by Example Bank and Example Bank would like each agent to have a consistent background when talking with a customer over a video communication.

Therefore, at step 2, a range image 702 of subject image frame 701 is generated. As with subject image frame 701, range image 702 may never actually be displayed but, instead, may merely exist as data in video communication environment 300. Range image 702 illustrates pixel distances of the various elements within subject image frame 701. At distance level 721 is the wall, shelf 713 is shown as at distance level 722, user 711 is at level 723, and desk 714 is at distance level 724. For clarity, in this example, range image 702 has only 4 distance levels indicating pixel distances however any granularity of distances, including infinite granularity, may be used. For example, the pixel distances for pixels representing desk 714 may get progressively larger towards user 711 and may also be able to distinguish the keyboard thereon.

At step 3, background pixels are identified and replaced with a new background image to produce image frame 703. Specifically, it is determined that all pixels having pixel distances greater than distance level 723 are behind user 711 and are background. Pixels in distance levels 721 and 722 are therefore identified as background pixels that will be replaced. In this example, the background pixels are replaced with pixels showing a banner for Example Bank with Example Bank's slogan thereunder on a plain background. Since user 711 is not part of the background, user 711 "obscures" a portion of the slogan. However, in some examples, the banner may be resized or otherwise changed so that the entirety of the slogan can be seen without being blocked by user 711.

The above steps are repeated on all frames of the video so that the Example Bank banner is displayed as the background of the video as a whole. To account for movement of user 711 or other objects captured in the foreground of the video, the pixels representing the background of the captured image may change over time. For example, in later frames of the video, user 711 may move to their left and obscure the "your" in the slogan while allowing the "serve all" portion (currently obscured in image frame 703) to be seen.

Figure 8:
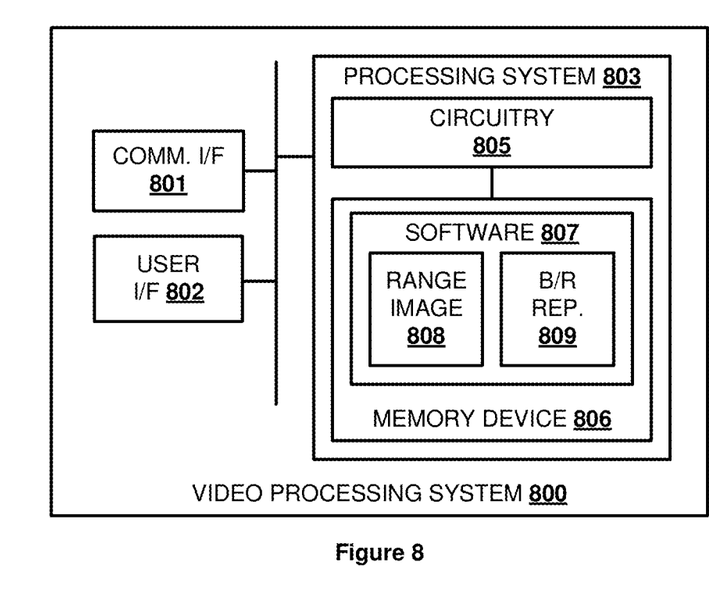
FIG. 8 illustrates a video processing system for replacing a video image background.

FIG. 8 illustrates video processing system 800. Video processing system 800 is an example of video processing system 101, although system 101 could use alternative configurations. Video processing system 800 comprises communication interface 801, user interface 802, and processing system 803. Processing system 803 is linked to communication interface 801 and user interface 802. Processing system 803 includes processing circuitry 805 and memory device 806 that stores operating software 807. Video processing system 800 may include other well-known components such as a battery and enclosure that are not shown for clarity. Video processing system 800 may be a personal computer, tablet, application server, conferencing system, private branch exchange, or some other computing apparatus—including combinations thereof.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user to receive user inputs and to present media and/or information. User interface 802 may include a speaker, microphone, camera, buttons, lights, display screen, touch screen, touch pad, scroll wheel, communication port, or some other user input/output apparatus—including combinations thereof. In some examples, user interface 802 includes a plenoptic camera. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Processing circuitry 805 is typically mounted on a circuit board that may also hold memory device 806 and portions of communication interface 801 and user interface 802. Operating software 807 comprises computer programs, firmware, or some other form of machine-readable processing instructions. Operating software 807 includes range image module 808 and background replacement module 809. Operating software 807 may further include an operating system, utilities, drivers, network interfaces, applications, or some other type of software. When executed by processing circuitry 805, operating software 807 directs processing system 803 to operate video processing system 800 as described herein.

In particular, range image module 808 directs processing system 803 to generate a range image from a subject image frame of a plurality of image frames included in a video. The range image indicates pixel distances from a plenoptic camera that captured the plurality of image frames. Background replacement module 809 directs processing system 803 to identify background pixels that represent a background portion of the subject image frame based on the range image. Background replacement module 809 also directs processing system 803 to replace the background pixels with replacement background pixels in the subject image frame.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of replacing a video background in real-time, wherein the video comprises a plurality of image frames, the method comprising:

generating a range image from a subject image frame of the plurality of image frames, wherein the range image indicates pixel distances from a plenoptic camera that captured the plurality of image frames;
identifying background pixels that represent a background portion of the subject image frame based on the range image; and
replacing the background pixels with replacement background pixels in the subject image frame.

2. The method of claim 1, wherein generating the range image comprises:
calculating a pixel distance for each pixel in at least a subset of pixels in the subject image frame based on perspectives of each pixel as captured by the plenoptic camera.

3. The method of claim 1, wherein the replacement background pixels represent an image frame of a second video.

4. The method of claim 1, wherein identifying the background pixels comprises:
identifying pixels of the subject image frame having pixel distances greater than a threshold distance from the plenoptic camera.

5. The method of claim 4, wherein the threshold distance comprises a pixel distance greater than that of pixels in the subject image frame representing a user in the subject image frame.

6. The method of claim 1, further comprising:
establishing a video communication between a first communication system having the plenoptic camera and a second communication system.

7. The method of claim 6, further comprising:
after replacing the background pixels, transferring the subject image frame to the second communication system.

8. The method of claim 6, wherein the first communication system comprises one of a plurality of communication systems for a contact center.

9. The method of claim 6, wherein generating the range image, identifying the background pixels, and replacing the background pixels are each performed by the first communication system.

10. The method of claim 1, further comprising:
generating a second range image from a second subject image frame of the plurality of image frames, wherein the second range image indicates second pixel distances from the plenoptic camera;
identifying second background pixels that represent a second background portion of the second subject image frame based on the second range image; and
replacing the second background pixels with second replacement background pixels in the subject image frame.

11. A video processing system to replace a video background in real-time, wherein the video comprises a plurality of image frames, the video processing system comprising:
an interface configured to receive the video from a plenoptic camera that captured the plurality of image frames; and
a processing system configured to generate a range image from a subject image frame of the plurality of image frames, identify background pixels that represent a background portion of the subject image frame based on the range image, and replace the background pixels with replacement background pixels in the subject image frame.

12. The video processing system of claim 11, wherein the processing system configured to generate the range image comprises:
 the processing system configured to calculate a pixel distance for each pixel in at least a subset of pixels in the subject image frame based on perspectives of each pixel as captured by the plenoptic camera.

13. The video processing system of claim 11, wherein the replacement background pixels represent an image frame of a second video.

14. The video processing system of claim 11, wherein the processing system configured to identify the background pixels comprises:
 the processing system configured to identify pixels of the subject image frame having pixel distances greater than a threshold distance from the plenoptic camera.

15. The video processing system of claim 14, wherein the threshold distance comprises a pixel distance greater than that of pixels in the subject image frame representing a user in the subject image frame.

16. The video processing system of claim 11, further comprising:
 a communication interface configured to establish a video communication between a first communication system having the plenoptic camera and a second communication system.

17. The video processing system of claim 16, further comprising:
 the communication interface configured to transfer the subject image frame to the second communication system after the processing system replaces the background pixels.

18. The video processing system of claim 16, wherein the first communication system comprises one of a plurality of communication systems for a contact center.

19. The video processing system of claim 16, wherein the first communication system includes the video processing system.

20. The video processing system of claim 11, further comprising:
 the processing system configured to generate a second range image from a second subject image frame of the plurality of image frames, wherein the second range image indicates second pixel distances from the plenoptic camera, identify second background pixels that represent a second background portion of the second subject image frame based on the second range image, and replace the second background pixels with second replacement background pixels in the subject image frame.

* * * * *